United States Patent [19]
Ohnishi et al.

[11] Patent Number: 5,971,583
[45] Date of Patent: Oct. 26, 1999

[54] METHOD AND APPARATUS FOR DEFINING SURFACES OF THREE-DIMENSIONAL OBJECT FROM THREE-DIMENSIONAL WIRE-FRAME MODEL

[75] Inventors: Akihiro Ohnishi; Hisanori Nakamura, both of Toyota; Hirohisa Sakai, Aichi-ken; Kenichi Mitsuta, Munakata, all of Japan

[73] Assignees: Toyota Jidosha Kabushiki Kaisha, Toyota; B P A Inc., Fukuoka, both of Japan

[21] Appl. No.: 08/904,427

[22] Filed: Jul. 31, 1997

[30] Foreign Application Priority Data

Jul. 31, 1996 [JP] Japan ................................. 8-201708

[51] Int. Cl.$^6$ .............................. G06F 19/00; G06G 7/66
[52] U.S. Cl. ............................. 364/468.04; 364/468.03; 364/468.25; 364/474.24; 364/474.05; 345/418; 345/420
[58] Field of Search ................... 364/474.05, 468.01, 364/468.02, 468.03, 468.04, 578, 560, 424.24, 468.09, 468.1, 468.11, 468.12; 395/133, 134, 123, 135, 19, 120, 121, 122, 129, 141; 345/418, 419, 139, 420, 141

[56] References Cited

U.S. PATENT DOCUMENTS

| | | | |
|---|---|---|---|
| 5,416,893 | 5/1995 | Herrell et al. | 395/122 |
| 5,475,799 | 12/1995 | Yoshioka et al. | 395/120 |
| 5,481,465 | 1/1996 | Ioth et al. | 364/468 |
| 5,579,454 | 11/1996 | Billyard et al. | 395/121 |
| 5,579,464 | 11/1996 | Saito et al. | 395/141 |
| 5,630,039 | 5/1997 | Fossum | 395/134 |
| 5,655,063 | 8/1997 | Crocker | 395/120 |
| 5,659,493 | 8/1997 | Kiridena et al. | 364/578 |
| 5,742,288 | 4/1998 | Nishizaka et al. | 345/418 |
| 5,742,291 | 4/1998 | Palm | 345/420 |
| 5,745,117 | 4/1998 | Masuda et al. | 345/420 |

FOREIGN PATENT DOCUMENTS 62-251965  11/1987  Japan .
8-21089  3/1996  Japan .

OTHER PUBLICATIONS

IBM Technical Disclosure Bulletin, vol. 33, No. 12, pp. 466 and 467, "Collection of Edges into Polygons in Fast Drawing System", May 1, 1991.

Alfred Van Kempen, et al., Automation in Construction, vol. 1, No. 1, pp. 7 to 13, "Design Modelling", May 1, 1992.

Pramod N. Chivate, et al., Computer–Aided Design, vol. 25, No. 9, pp. 587 to 600, "Solid–Model Generation From Measured Point Data", Sep. 1, 1993.

*Primary Examiner*—William Grant
*Assistant Examiner*—Ramesh Patel
*Attorney, Agent, or Firm*—Oblon, Spivak, McClelland, Maier & Neustadt, P.C.

[57] ABSTRACT

Computer-aided method and apparatus for defining surfaces of a three-dimensional object on the basis of a three-dimensional wire-frame model, wherein a plurality of pairs of edges selected from edges which constitute the three-dimensional wire-frame model are sequentially pointed, each pointed pair consisting of two edges lying on the same plane, and a group of candidate edges is determined, the group consisting of the currently pointed pair of edges and at least one edge lying on the same plane as the edges of the currently pointed pair, so that those candidate edges of the determined group which cooperate to define a closed loop are determined as a set of closed-loop defining edges, and a surface of the three-dimensional object is defined on the basis of the set of closed-loop defining edges.

6 Claims, 6 Drawing Sheets

5,971,583

METHOD AND APPARATUS FOR DEFINING SURFACES OF THREE-DIMENSIONAL OBJECT FROM THREE-DIMENSIONAL WIRE-FRAME MODEL

The present application is based on Japanese Patent Application No. 8-201708 filed Jul. 31, 1997, the content of which is incorporated hereinto by reference.

BACKGROUND OF THE INVENTION

1. Field of the Invention

The present invention relates to a method and an apparatus for efficiently defining surfaces of a three-dimensional object from a three-dimensional wire-frame model as in a three-dimensional modeling system using a computer, such as computer-aided design (CAD) and computer-aided manufacturing (CAM).

2. Discussion of the Related Art

A CAD or CAM system as disclosed in JP-A-62-251965 is adapted to newly design or re-design parts or products having a certain shape, by using wire-frame models which are relatively simple in data construction. In such a CAD or CAM system, the wire-frame models are automatically processed into desired solid models. While such wire-frame models enable a human being to imagine three-dimensional objects, each wire-frame model is nothing but a group of edges (segments), namely, consists of a list of coordinate values of vertices (apices) in a three-dimensional coordinate system, and a list of the edges or segments each connecting the adjacent vertices. Therefore, suitable processing of the wire-frame models is required to erase hidden lines, to obtain volumes or weights of the objects, or to convert them into solid models. The processing includes definition of a plurality of surfaces or faces which collectively define each three-dimensional object.

For defining the surfaces of an object from a three-dimensional wire-frame model, each of the edges is checked to determine whether this edge cooperates with any other edges connected thereto to define a closed loop. Each closed loop is defined or determined as a surface of the three-dimensional object corresponding to the wire-frame models.

To effect the above determination as to whether the closed loops are defined, multiple edges connected to each edge in question are sequentially pointed for the determination. Accordingly, the computer of the system requires a considerably long processing time for defining the surfaces from the wire-frame models. This is a drawback of the conventional system.

SUMMARY OF THE INVENTION

It is therefore a first object of the present invention to provide a method by which the surfaces of a three-dimensional object can be efficiently defined from a three-dimensional wire-frame model.

It is a second object of the invention to provide an apparatus suitable for practicing the method of the invention.

The first object indicated above may be achieved according to a first aspect of this invention, which provides a method of defining surfaces of a three-dimensional object on the basis of a three-dimensional wire-frame model, using a computer, wherein the method includes an edge pair pointing step of sequentially pointing a plurality of pairs of edges selected from edges which constitute the three-dimensional wire-frame model, each of the pairs of edges consisting of two edges lying on the same plane, a candidate edge determining step of determining a group of candidate edges consisting of the edges of a currently pointed one of the plurality of pairs and at least one edge which lies on the same plane as the edges of the currently pointed one of the plurality of pairs, a closed-loop edge set determining step of determining, as a set of closed-loop defining edges, those ones of the candidate edges of the group which cooperate to define a closed loop, and a surface defining step of defining a surface of the three-dimensional object, on the basis of the set of closed-loop defining edges.

In the computer-aided surface defining method of the present invention described above, the edge pair pointing step is formulated to sequentially point the pairs of edges, each pair consisting of two edges lying on the same one plane, and the candidate edge determining step is formulated to determine groups of candidate edges, each group consisting of the edges of the currently pointed pair and at least one edge lying on the same plane as the edges of the currently pointed pair. Further, the closed-loop edge set determining step is formulated to determine a set of closed-loop defining edges, which consist of those candidate edges of the group under examination which cooperate with each other to define a closed loop. The surface defining step is formulated to define the surfaces of the three-dimensional object on the basis of the respective sets of closed-loop defining edges determined on the basis of the respective groups of candidate edges. In the present method, the determination as to whether the edges define a closed loop is effected for each group of candidate edges. Since all of the candidate edges including the currently selected pair of edges lie on the same plane, the number of the edges for which the determination is effected for each edge of the wire-frame model is considerably smaller than the number of edges for which similar determination is conventionally effected for each edge. In the conventional method, the determination for each edge is effected for all of the other edges. Accordingly, the efficiency of surface definition on the basis of the three-dimensional wire-frame model according to the present invention is significantly improved.

In one preferred form of the method of this invention, the edge pair pointing step comprises sequentially pointing the plurality of pairs of edges, each pair consisting of two mutually connected edges lying on the same plane. Since the two edges of the pointed pair necessarily lie on the same plane, it is not necessary to effect a step of determining whether the two edges which are not connected to each other lie on the same plane or not.

In another preferred form of the method, the three-dimensional wire-frame model includes coordinate values, in a three-dimensional coordinate system, of each of two vertices defining each of the edges of the three-dimensional wire-frame model, and the surface defining step comprises preparing a list of surfaces wherein each of the surfaces is represented by the set of closed-loop defining edges each defined by the two vertices whose coordinate values are known.

The second object indicated above may be achieved according to a second aspect of the present invention, which provides a computer-aided apparatus for defining surfaces of a three-dimensional object on the basis of a three-dimensional wire-frame model, wherein the apparatus includes edge pair pointing means for sequentially pointing a plurality of pairs of edges selected from edges which constitute the three-dimensional wire-frame model, each of the pairs of edges consisting of two edges lying on the same plane, candidate edge determining means for determining a group of candidate edges consisting of the edges of a currently pointed one of the plurality of pairs and at least one edge which lies on the same plane as the edges of the currently pointed one of the plurality of pairs, closed-loop edge set determining means for determining, as a set of closed-loop defining edges, those ones of the candidate edges of the group which cooperate to define a closed loop, and surface defining means for defining a surface of the three-dimensional object, on the basis of the set of closed-loop defining edges.

In the computer-aided surface defining apparatus of the present invention described above, the edge pair pointing means is adapted to sequentially point the pairs of edges, each pair consisting of two edges lying on the same one plane, and the candidate edge determining means is adapted to determine groups of candidate edges, each group consisting of the edges of the currently pointed pair and at least one edge lying on the same plane as the edges of the currently pointed pair. Further, the closed-loop edge set determining means is adapted to determine a set of closed-loop defining edges, which consist of those candidate edges of the group under examination which cooperate with each other to define a closed loop. The surface defining means is adapted to define the surfaces of the three-dimensional object on the basis of the respective sets of closed-loop defining edges determined on the basis of the respective groups of candidate edges. In the present computer-aided apparatus, the determination as to whether the edges define a closed loop is effected for each group of candidate edges. Since all of the candidate edges including the currently selected pair of edges lie on the same plane, the number of the edges for which the determination is effected for each edge of the wire-frame model is considerably smaller than the number of edges for which similar determination is conventionally effected for each edge. In the conventional method, the determination for each edge is effected for all of the other edges. Accordingly, the efficiency of surface definition on the basis of the three-dimensional wire-frame model according to the present invention is significantly improved.

In one preferred form of the apparatus of the invention, the edge pair pointing means comprises means for sequentially pointing the plurality of pairs of edges, each pair consisting of two mutually connected edges lying on the same plane.

In another preferred form of the apparatus, the three-dimensional wire-frame model includes coordinate values, in a three-dimensional coordinate system, of each of two vertices defining each of the edges of the three-dimensional wire-frame model, and the surface defining step comprises preparing a list of surfaces wherein each of the surfaces is represented by the set of closed-loop defining edges each defined by the two vertices whose coordinate values are known.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
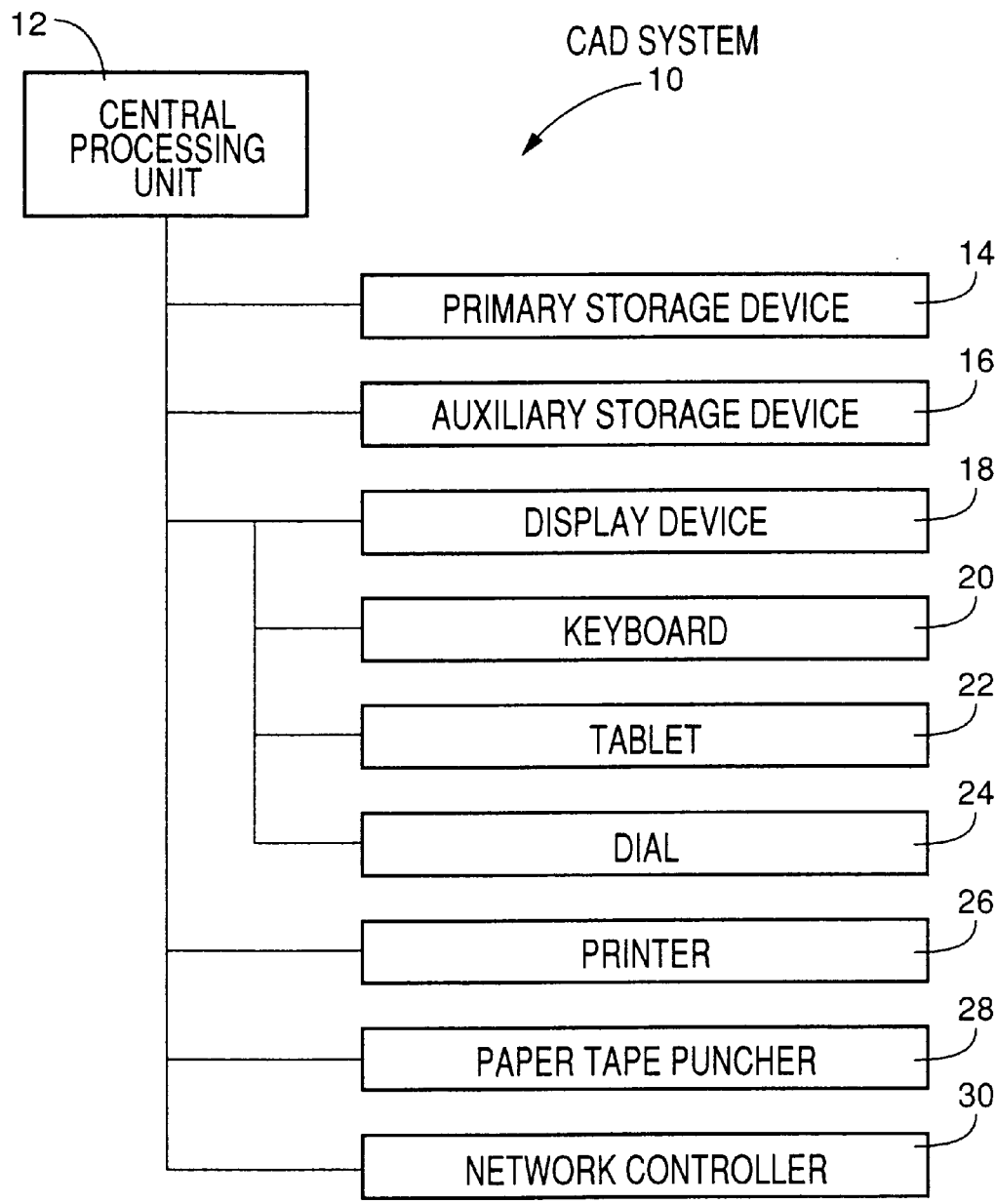
FIG. 1 is a block diagram illustrating a CAD system constructed according to one embodiment of the present invention.

Referring first to the block diagram of FIG. 1, a computer-aided design (CAD) system 10 includes a central processing unit 12, a primary storage device 14 incorporating a random-access memory (RAM) and a read-only memory (ROM), and an expandable auxiliary storage device 16 such as a hard disc device, an MO storage and a tape storage. The central processing unit 12 operates to perform various operations according to control programs stored in the primary storage device 14, while utilizing a temporary data storage function of the primary storage device 14 and auxiliary storage device 16. The operations performed by the central processing unit 12 include: operations to generate or modify three-dimensional wire-frame models; operations to define the surfaces of three-dimensional objects from the three-dimensional wire-frame models; operations to generate, expand, contract, modify, translate and rotate solid models on the basis of the three-dimensional wire-frame models whose surfaces have been defined; operations to obtain a sum (a union set), a difference (a difference set) or a product (an intersection set) of three-dimensional models; and operations to define cross sectional shapes of desired portions of three-dimensional models.

The CAD system 10 further includes a display device 18 such as a cathode ray tube (CRT) or a liquid crystal display (LCD) panel, a keyboard 20, a tablet 22, and a dial 24. The display device 18 is adapted to provide visual representation of images such as the three-dimensional models, and operation menu which permits the operator of the system to easily select desired operations to be performed. The keyboard 20, tablet 22 and dial 24 function as a data input device through which the operator enters appropriate data necessary to generate three-dimensional models, and numerical control (NC) data for moving the three-dimensional models. The data input device is also used for commanding the system to perform the operations to expand, contract, modify, move or rotate the three-dimensional models, to obtain the sum, difference or product of the three-dimensional models, and to select the desired operation through the menu provided on the display device 18.

The CAD system is equipped with a printer 26, a paper tape puncher 28, and a network controller 30. The printer 26 is capable of printing NC data, and other data as displayed on the display device 18 or obtained by the central processing unit 12. The paper tape puncher 28 is provided to prepare NC tapes used by machine tools for machining operations. The network controller 30 is connected to a work station or machine tools for data communications therebetween.

Figure 2:
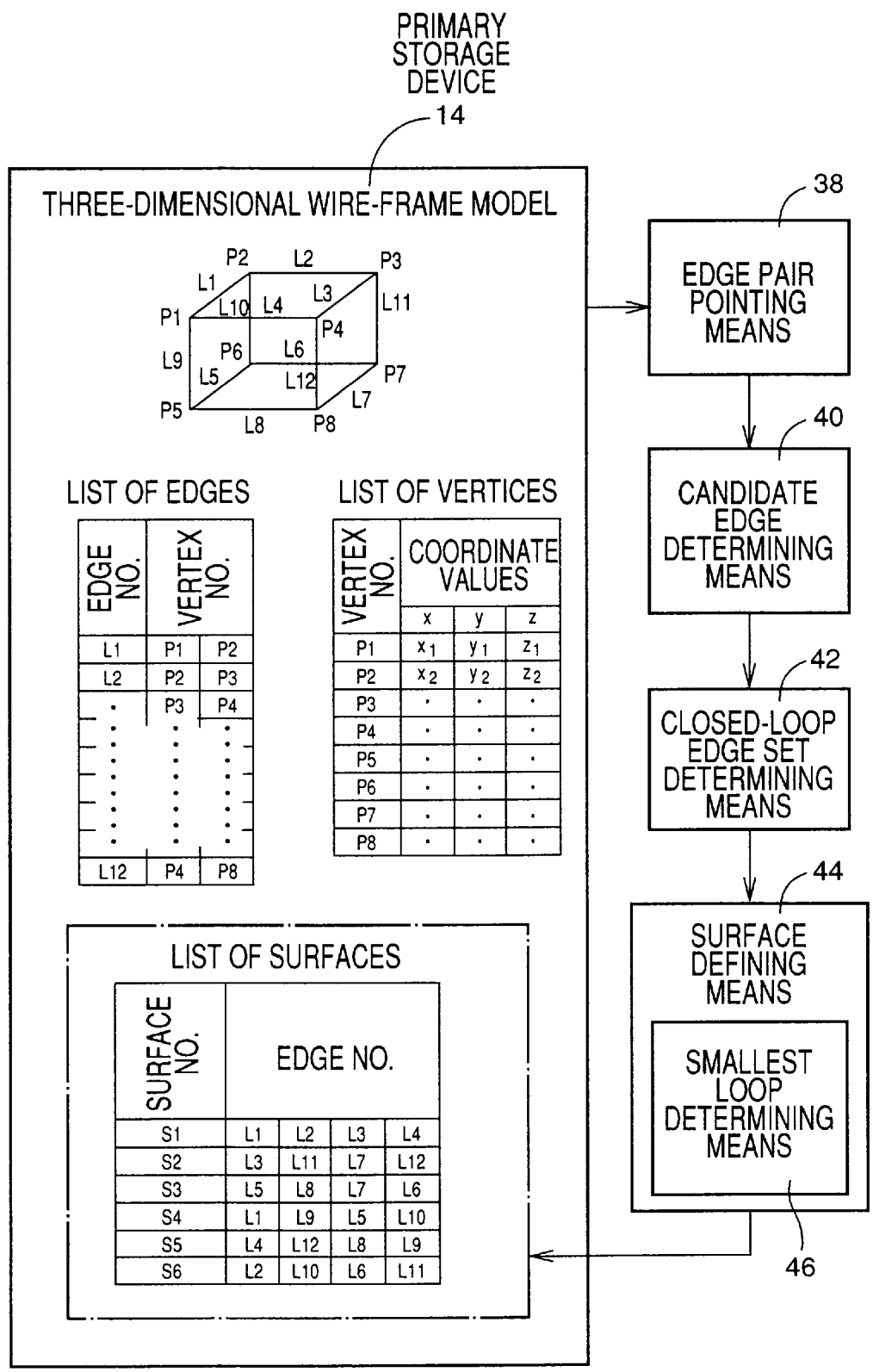
FIG. 2 is a block diagram illustrating functional means of a central processing unit of the CAD system of FIG. 1, together with the content of a primary storage devices.
Figure 3:
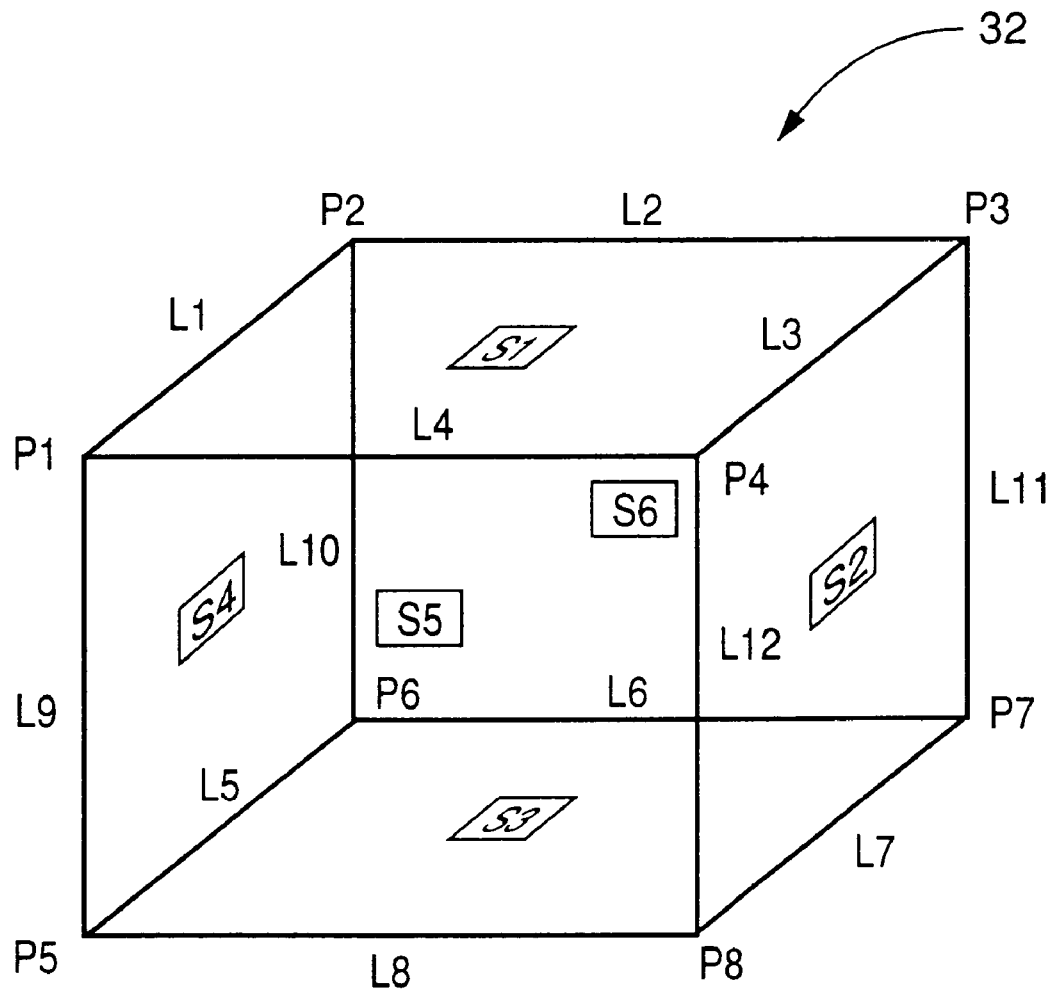
FIG. 3 is a view showing one example of a three-dimensional wire-frame model from which surfaces of the corresponding object are automatically defined by the central processing unit.

Referring to the block diagram of FIG. 2, there are illustrated functional means of the central processing unit 12 which are provided to automatically define the surfaces of three-dimensional objects on the basis of three-dimensional wire-frame models while these wire-frame models are stored in the primary storage device 14. As shown in FIG. 2, each three-dimensional wire-frame model for which the surfaces are defined includes a list of the coordinate values of each vertex (apex) P, and a list of edges (segments) L each of which is defined by adjacent two vertices. Where the three-dimensional wire-frame model is a cube 32 as shown in FIG. 3, by way of example, the list of the vertices P and the list of the edges L are as indicated in TABLES 1 and 2 given below:

TABLE 1

| VERTEX NO. | | X-CO-ORDINATE | Y-CO-ORDINATE | Z-CO-ORDINATE |
|---|---|---|---|---|
| No. 1 | P1 | x1 | y1 | z1 |
| No. 2 | P2 | x2 | y2 | z2 |
| No. 3 | P3 | x3 | y3 | z3 |
| No. 4 | P4 | x4 | y4 | z4 |
| No. 5 | P5 | x5 | y5 | z5 |
| No. 6 | P6 | x6 | y6 | z6 |
| No. 7 | P7 | x7 | y7 | z7 |
| No. 8 | P8 | x8 | y8 | z8 |

TABLE 2

| EDGE NO. | VERTEX NO. | EDGE NO. | VERTEX NO. |
|---|---|---|---|
| No. 1 | L1 | P1, P2 | No. 7 | L7 | P7, P8 |
| No. 2 | L2 | P2, P3 | No. 8 | L8 | P8, P5 |
| No. 3 | L3 | P3, P4 | No. 9 | L9 | P1, P5 |
| No. 4 | L4 | P4, P1 | No. 10 | L10 | P2, P6 |
| No. 5 | L5 | P5, P6 | No. 11 | L11 | P3, P7 |
| No. 6 | L6 | P6, P7 | No. 12 | L12 | P4, P8 |

In TABLES 1 and 2, the vertices P are represented by the X-, Y- and Z-coordinate values x, y and z in the X-Y-Z rectangular coordinate system, while each edge L is represented by the two vertices corresponding to its opposite ends (start and end points).

The central processing unit 12 includes edge pair pointing means 38, candidate edge determining means 40, closed-loop edge set determining means 42 and surface defining means 44.

The edge pair pointing means 38 is adapted to sequentially point or designate pairs of edges selected from the edges constituting the three-dimensional wire-frame model, each pair consisting of two mutually connected edges lying on the same one plane. In the example of the cube 32 of FIG. 3, these pairs of mutually connected edges include, for instance: a pair of edges L1 and L2; a pair of edges L2 and L3; a pair of edges L2 and L11; a pair of edges L3 and L12; and a pair of edges L3 and L4.

The candidate edge determining means 40 is adapted to determine a group of candidate edges consisting of the two connected edges of the pair currently pointed by the edge pair pointing means 38, and at least one edge which lies on the same plane as the currently pointed pair of edges. Where the pair of connected edges L1 and L2 is pointed by the edge pair pointing means 38, for example, the candidate edge determining means 42 determines the edges L1, L2, L3 and L4 as a group of candidate edges, since the edges L3 and L4 lie on the same plane as the pointed pair of edges L1 and L2.

The closed-loop edge set determining means 42 is adapted to determine whether the pair of edges currently pointed by the edge pair pointing means 38 cooperate with any of the other candidate edges determined by the candidate edge determining means 40, to define a closed loop, namely, a wire frame. In the case where the pair of connected edges L1 and L2 is pointed by the edge pair pointing means 38 and where the edges L1–L4 are determined as the group of candidate edges by the candidate edge determining means 40, the closed-loop edge set determining means 42 determines whether the edges L1 and L2 cooperate with the edge L3 and/or the edge L4, to define a closed loop. The closed-loop edge set determining means 42 determines the edges defining each closed loop, as a set of closed-loop defining edges, and stores this set of closed-loop defining edges. Although the manner of determining whether the three or more edges define a closed loop is similar to the conventionally practiced manner, the present method of defining the surfaces of a three-dimensional object on the basis of a three-dimensional wire-frame model is different from the conventional method in that the edges (referred to as "candidate edges") to be checked for the above determination by the closed-loop edge set determining means 42 all lie on the same plane.

The surface defining means 44 is adapted to define a surface or face of the object corresponding to the three-dimensional wire-frame model, on the basis of each set of closed-loop defining edges determined by the closed-loop edge set determining means 44. Where the edges L1, L2, L3 and L4 are determined as a set of closed-loop defining edges by the closed-loop edge set determining means 42, for example, the surface defining means 44 prepares and stores data indicating that a surface S1 is defined by the four edges L1–L4. The thus prepared data constitute a part of a list of surfaces wherein the surfaces are defined by respective sets of closed-loop defining edges.

With repeated operations of the edge pair pointing means 38, candidate edge determining means 40, closed-loop edge set determining means 42 and surface defining means 44, all of the surfaces defining the three-dimensional object corresponding to the three-dimensional wire-frame model are defined, and the list of the surfaces is stored in the primary storage device 14, as indicated in FIG. 2. TABLE 3 given below shows the list of surfaces of the cube 32 of FIG. 3, which is an example of a three-dimensional object that can be derived from a three-dimensional wire-frame model.

TABLE 3

| | SURFACE NO. | EDGE NO. |
|---|---|---|
| No. 1 | S1 | L1, L2, L3, L4 |
| No. 2 | S2 | L3, L11, L7, L12 |
| No. 3 | S3 | L5, L8, L7, L6 |
| No. 4 | S4 | L1, L9, L5, L10 |
| No. 5 | S5 | L4, L12, L8, L9 |
| No. 6 | S6 | L2, L10, L6, L11 |

The surface defining means 44 may incorporate smallest loop determining means 46, which is operated if two or more closed loops are determined by the closed-loop edge set determining means 42. The smallest closed loop determining means 46 is adapted to determine or select a smallest one of the closed loops, so that the selected smallest closed loop is used for the surface definition by the surface defining means 44.

Figure 4:
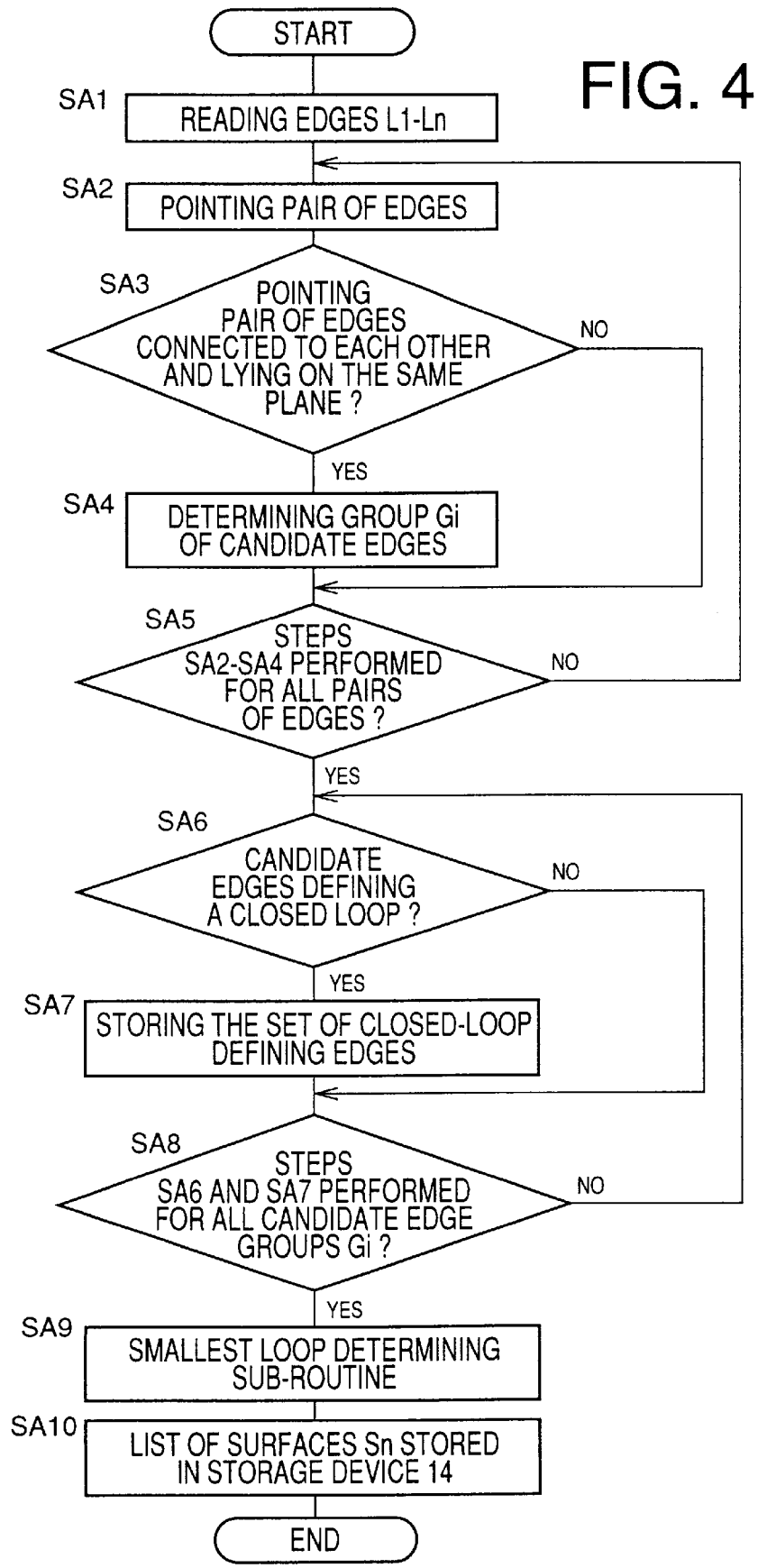
FIG. 4 is a flow chart illustrating a routine executed by the central processing unit to automatically define the surfaces of the solid object.

The central processing unit 12 is adapted to execute a surface defining routine illustrated in the flow chart of FIG. 4. This surface defining routine is initiated with step SA1 to read the edges (segments) L1–Ln of the three-dimensional wire-frame model under examination. In the example of the wire-frame model for the cube 32 of FIG. 3, the twelve edges L1 through L12 are read out from the edge list (indicated in TABLE 2) stored in the primary storage device 14.

Step SA1 is followed by step SA2 in which a pair of edges (e.g., L1 and L2) of the wire-frame model is pointed. With repeated implementation of this step SA2, the different pairs of edges are sequentially pointed in a predetermined order. For instance, the edges L1 and L2 are initially pointed as the first pair of edges in step SA2.

Then, the control flow goes to step SA3 to determine whether the two edges of the pair pointed in step SA3 are connected to each other and lie on the same one plane. For instance, this determination is effected on the basis of the coordinate values x, y and z of the two vertices (apices) defining the opposite ends of each of the two edges of the currently pointed pair. If two or more pairs of connected edges exist on the same plane, only one of these pairs (e.g., only the first pair) is selected, and the other pair or pairs is/are discarded. While four pairs of connected edges (L1-L2, L2-L3, L3-L4 and L1-L4) exist on a plane including the edges L1 and L2, for example, only the pair of edges L1 and L2 is selected, for instance. It will be understood that steps SA2 and SA3 correspond to the edge pair pointing means 38 for sequentially pointing the pairs of mutually connected edges lying on the same plane.

If a negative decision (NO) is obtained in step SA3, the control flow goes to step SA5, while skipping step SA4. If an affirmative decision (YES) is obtained in step SA3, the control flow goes to step SA4 corresponding to the candidate edge determining means 40 described above, to determine whether each of the edges read in step SA1 (all edges L1–L12) of the wire-frame model) lies on the same plane as the pointed point of connected edges. For instance, the edges L3 and L4 are determined to lie on the same plane as the currently pointed pair of connected edges L1 and L2, and these four edges are determined as a group G1 of candidate edges lying on the same plane.

Then, the control flow goes to step SA5 to determine whether steps SA2, SA3 and SA4 have been implemented for all of the pairs of edges. In other words, steps SA2–SA4 are repeatedly implemented until an affirmative decision (YES) is obtained in step SA5. Thus, a plurality of groups Gi (i=1 through p) of candidate edges are determined corresponding to the respective pairs of mutually connected edges lying on the same plane. The candidate edge groups Gi determined by the candidate edge determining means 40 in step SA4 are stored.

When the affirmative decision (YES) is obtained in step SA5, the control flow goes to step SA6 to point one of the candidate edge groups Gi and determine whether the currently pointed candidate edge group Gi includes edges which cooperate to define a closed loop. If a negative decision (NO) is obtained in step SA6, the control flow goes to step SA8 to determine whether steps SA6 and SA7 have been implemented for all of the candidate edge groups Gi (i=1 through p). If a negative decision (NO) is obtained in step SA8, the control flow goes back to step SA6. Thus, the candidate edge groups Gi are sequentially pointed, and the determination in step SA6 is effected for all of the candidate edge groups Gi.

Figure 5:
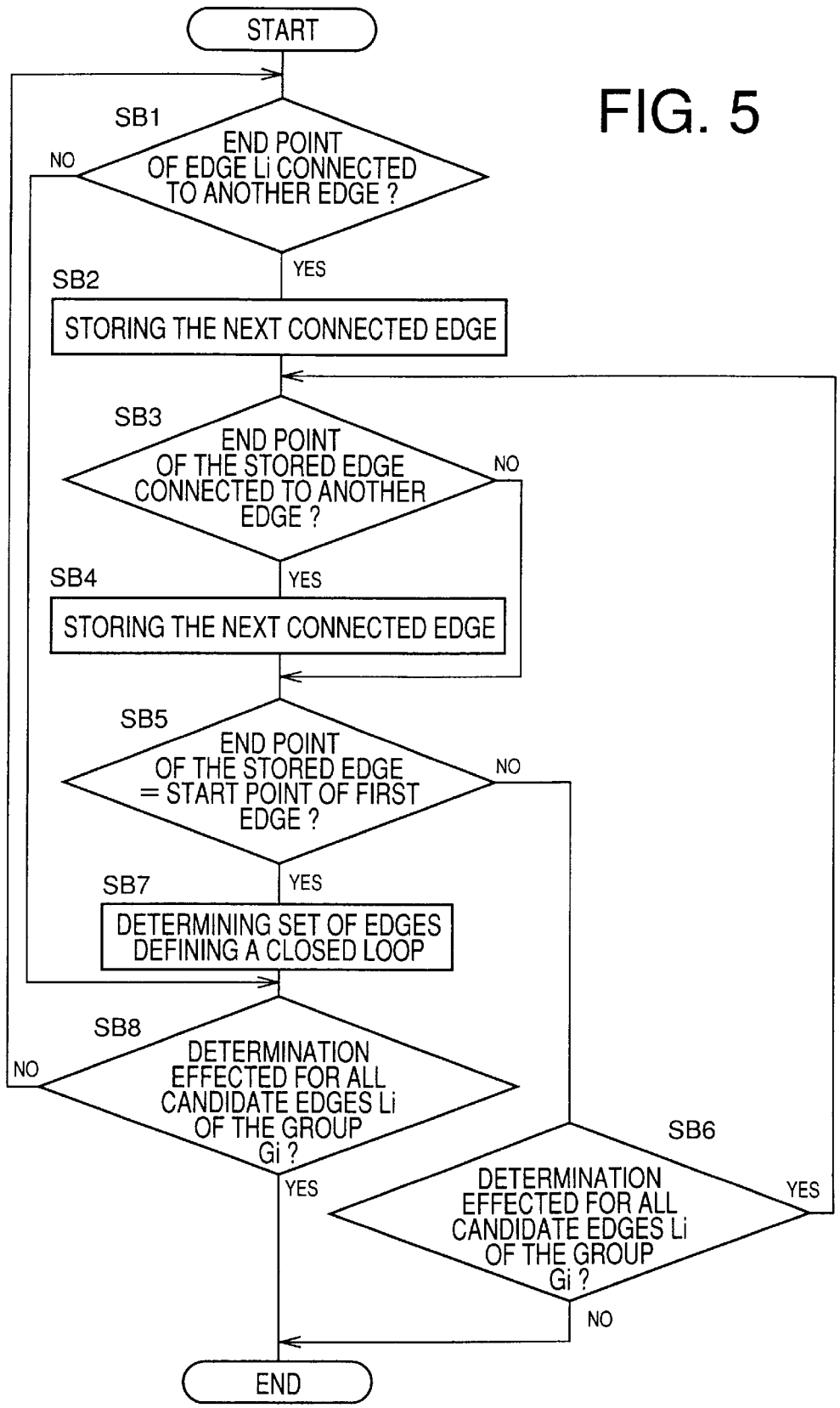
FIG. 5 is a flow chart illustrating a closed-loop determining sub-routine executed in step SA6 of the routine of FIG. 4.

The determination in step SA6 is effected according to a closed-loop determining sub-routine illustrated in the flow chart of FIG. 5. The sub-routine is initiated with step SB1 to determine whether a currently pointed one of the candidate edges Li of the pointed candidate edge group Gi is connected at its end point to another candidate edge Li. If a negative decision (NO) is obtained in step SB1, the control flow goes to step SB8 to determine whether the determination has been effected for all of the candidate edges Li of the group Gi under examination. If a negative decision (NO) is obtained in step SB8, the control flow goes back to step SB1. Thus, the candidate edges of the group Gi under examination are sequentially pointed, and the determination in step SB1 is effected for all candidate edges Li of the group Gi under examination. If an affirmative decision (YES) is obtained in step SB1, the control flow goes to step SB2 to store the next candidate edge to which the end point of the candidate edge Li under examination is connected. Step SB2 is followed by step SB3 to determine whether the stored candidate edge is connected at its end point to another candidate edge of the group Gi. If an affirmative decision (YES) is obtained, the control flow goes to step SB4 to store the next candidate edge to which the end point of the candidate edge is connected. Step SB4 is followed by step SB5 to determine whether the end point of the stored candidate edge is the same as the start point of the candidate edge for which the affirmative decision (YES) was obtained in step SB1. If a negative decision (NO) is obtained in step SB5, the control flow goes to step SB6 to determine whether the determination has been effected for all of the candidate edges Li of the group Gi under examination. Steps SB3–SB5 are repeatedly implemented until an affirmative decision (YES) is obtained in step SB5.

When the affirmative decision (YES) is obtained in step SB5, the control flow goes to step SB7 in which the candidate edges Li of the group Gi which have been determined to be connected end to end are determined as a set of closed-loop defining edges. Step SB7 is followed by step SB8 to determine whether the determination has been effected for all candidate edges of the group Gi under examination. Thus, steps SB1–SB7 are repeated for all of the candidate edges of the group Gi.

Referring back to the routine of FIG. 4, the control flow goes to step SA7 if an affirmative decision (YES) is obtained in step SA6. In step 7A, the determined set of closed-loop defining edges is stored in the primary storage device 14. In the case of the candidate edge group G1 consisting of the candidate edges L1, L2, L3 and L4, all of the four candidate edges L1–L4 cooperate with each other to define a closed loop, namely, a surface S1 of a three-dimensional object corresponding to the three-dimensional wire-frame model in question. In this case, the four edges L1–L4 are stored as a set of closed-loop defining edges in relation to the surface S1, as part of the surface list, in the primary storage memory 14, as indicated in FIG. 2.

It will be understood that steps SA6 and SA7 correspond to the closed-loop edge set determining means 42 for determining a set of closed-loop defining edges which belong to the candidate edge group Gi and which lie on the same plane.

Step SA7 is followed by step SA8 indicated above, to determine whether steps SA6 and SA7 have been performed for all of the candidate edge groups Gi. Steps SA6 and SA7 are repeatedly implemented until an affirmative decision (YES) is obtained in step SA8.

When the affirmative decision (YES) is obtained in step SA8, the control flow goes to step SA9 corresponding to the smallest loop determining means 46, to determine the smallest one of the closed loops if these closed loops are defined by the candidate edges Li of the same group Gi. Namely, this step SA8 is implemented for each of the candidate edge groups Gi, whose candidate edges define two or more closed loops (number of the loops=n). The determination in step SA9 is effected for each of those candidate edge groups Gi, according to a smallest loop determining sub-routine illustrated in the flow chart of FIG. 6.

Figure 6:
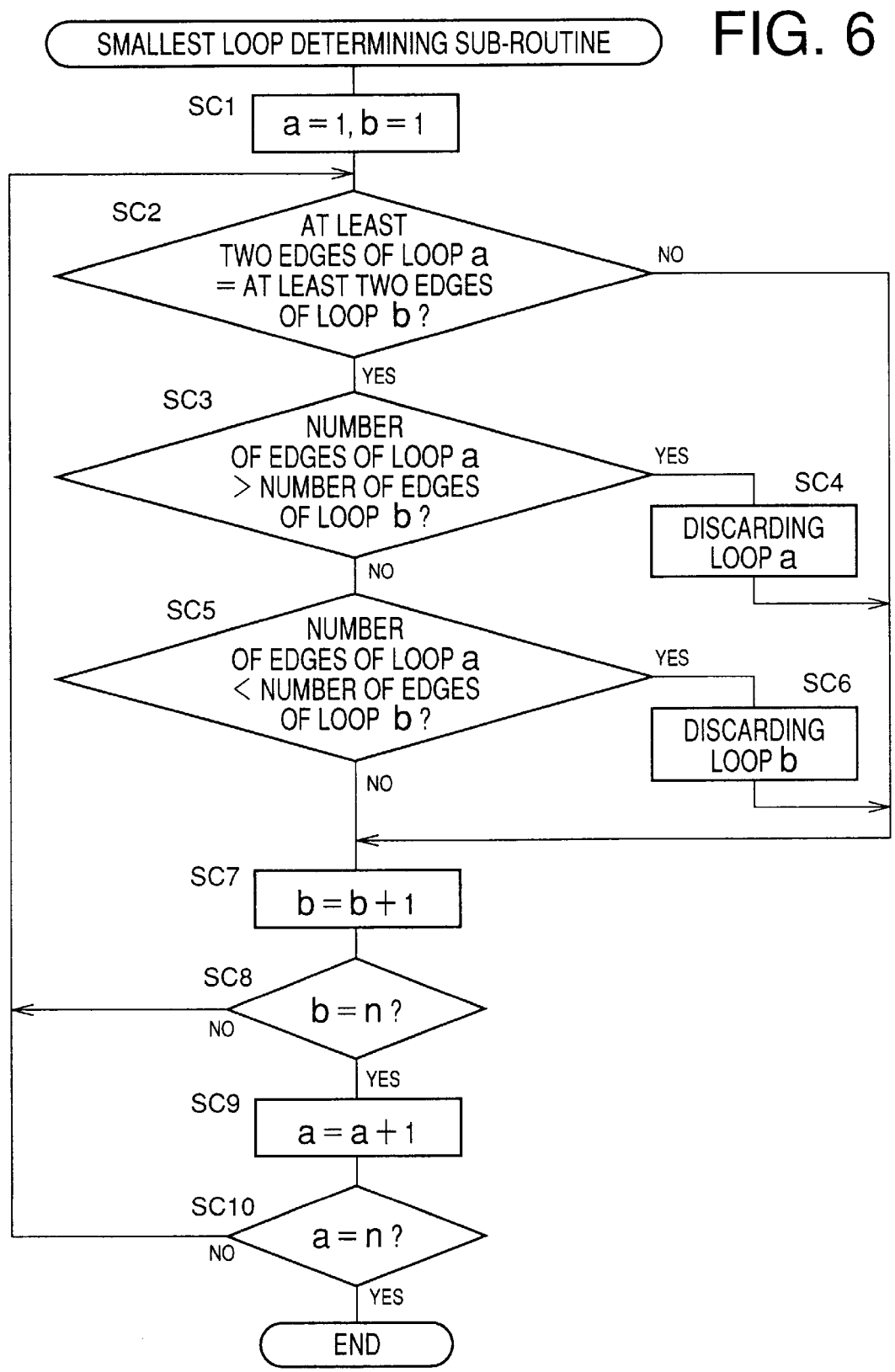
FIG. 6 is a flow chart illustrating a smallest loop determining sub-routine executed in step SA9 of the routine of FIG. 4.

The sub-routine of FIG. 6 is initiated with step SC1 in which counters "a" and "b" are set at "1". The counters "a" and "b" correspond to the respective closed loops "a" and "b" which are defined by the candidate edges Li of the group Gi under examination. Step SC1 is followed by step SC2 to determine whether the two or more edges of the closed loop "a" are the same as the two or more edges of the closed loop "b". If a negative decision (NO) is obtained in step SC2, the control flow goes to step SC7 and the subsequent steps to increment the counters "a" and "b". If an affirmative decision (YES) is obtained in step SC2, the control flow goes to step SC3 to determine whether the number of the closed loop "a" is larger than the number of the closed loop "b". If an affirmative decision (YES) is obtained in step SC3, the control flow goes to step SC4 to discard the closed loop "a". If a negative decision (NO) is obtained in step SC3, the control flow goes to step SC5 to determine whether the number of the edges of the closed loop "a" is smaller than the number of the edges of the closed loop "b". If an affirmative decision (YES) is obtained in step SC5, the control flow goes to step SC6 to discard the closed loop "b". If a negative decision (NO) is obtained in step SC5, the control flow goes to step SC7 to increment the counter "b".

Step SC7 is followed by step SC8 to determine whether the content of the counter "b" is equal to "n" which represents the number of the closed loops defined by the group Gi under examination. If a negative decision (NO) is obtained in step SC8, the control flow goes back to step SC2. Steps SC2–SC7 are repeatedly implemented until an affirmative decision (YES) is obtained in step SC8. When the affirmative decision is obtained in step SC8, the control flow goes to step SC9 to increment the counter "a". Step SC8 is followed by step SC10 to determine whether the content of the counter "a" is equal to "n". If a negative decision (NO) is obtained steps SC2–SC9 are repeatedly implemented until an affirmative decision (YES) is obtained. The sub-routine of FIG. 6 is terminated when the affirmative decision is obtained in step SC10.

Referring back to the flow chart of FIG. 4, step SA9 is followed by step SA10 corresponding to the surface defining means 44, in which all of the surfaces Sn (e.g., surfaces S1 through S6) of the three-dimensional object are defined by the respective sets of closed-loop defining edges Li, and a list of the surfaces Sn is stored in the primary storage device 14, as indicated in TABLE 3 by way of example. In this example, the surface S1 is defined by the four edges L1, L2, L3 and L4, while the surface S2 is defined by the four edges L3, L11, L7 and L12, for instance. If two or more sets of closed-loop defining edges exist for the same surface Sn, only one of these sets is stored, and the remainder is discarded.

In the present embodiment of the invention, which is applicable to the three-dimensional wire-frame model for the cube 32, for example, the edge pair pointing means 38 operates in steps SA2 and SA3 to sequentially point the pairs of edges, each pair consisting of two mutually connected edges which lie on the same plane. In step SA4, the candidate edge determining means 40 operates to determine groups Gi of candidate edges, each group Gi consisting of the currently pointed pair of mutually connected edges and one or more edges lying on the same plane as the pointed pair of edges. In steps SA6 and SA7, the closed-loop edge set determining means 42 operates to determine sets of closed-loop defining edges, each set consisting of the edges which define a closed loop on the plane of each group Gi under examination. In step SA10, the surface defining means 44 operates to define the surfaces on the basis of the respective sets of closed-loop defining edges determined by the closed-loop edge set determining means 42.

In the present embodiment, the determination as to whether the edges define a closed loop or wire frame is effected for each group Gi of candidate edges. Since all of the candidate edges of each group Gi including the currently pointed pair of connected edges lie on the same plane, the number of the edges for which the determination is effected for each edge of the wire-frame model is considerably smaller than the number of edges for which similar determination is conventionally effected for each edge. In the conventional method, the determination for each edge is effected for all of the other edges. Accordingly, the efficiency of surface definition on the basis of the three-dimensional wire-frame model according to the present invention is significantly improved.

In the conventional method, too, a closed-loop determining sub-routine as illustrated in the flow chart of FIG. 5 is executed for determining the closed loops defining the surfaces of a three-dimensional object, on the basis of the corresponding wire-frame model. Where this conventional method is applied to the wire-frame model as illustrated in FIG. 3, for instance, the determination to find closed loops involving the edge L1 should be effected as many as 14 times corresponding to the following 14 closed loops: L1-L2-L3-L4;

L1-L2-L3-L-12-L8-L9; L1-L2-L3-L12-L7-L6-L5-L9; L1-L2-L11-L6-L5-L9; L1-L2-L11-L6-L5-L8-L12-L4; L1-L2-L11-L7-L8-L9, L1-L2-L11-L7-L12-L4; L1-L10-L5-L9; L1-L10-L5-L8-L7-L11-L3-L4; L1-L10-L5-L8-L12-L4; L1-L10-L6-L7-L8-L9; L1-L10-L6-L7-L12-L4; L1-L10-L6-L11-L3-L4; L1-L10-L6-L11-L3-L12-L8-L9. Similar determination should be effected for the edges L2 through L12. Therefore, the total number of operations to find the closed loops according to the conventional method amounts to $12^{14}$. In the present embodiment, step SA6 is repeated for the six groups Gi of candidate edges lying on respective six planes, so that the number of determinations that should be effected in steps SB1, SB3 and SB5 is considerably reduced, and the required data processing time is accordingly reduced.

While the presently preferred embodiment of this invention has been described above in detail by reference to the accompanying drawings, it is to be understood that the invention may be otherwise embodied.

In the illustrated embodiment, the candidate edge determining means 40 or step SA3 is adapted determine all groups Gi of candidate edges corresponding to respective planes, before the closed-loop edge set determining means 42 or step SA6, SA7 determines whether the candidate edges of each group Gi include the edges defining a closed loop. However, the routine of FIG. 4 may be modified such that the candidate edge determining means 40 or step SA3 and the closed-loop edge set determining means 42 are operated or performed alternately so that the determination by the closed-loop edge set determining means 42 (in steps SA6, SA7) is followed by the determination of each candidate edge group Gi by the candidate edge determining means 40 (in step SA3). For instance, step SA8 is eliminated, and step SA5 is moved so that step SA7 is followed by step SA5. In this case, the control flow goes back to step SA2 if the negative decision (NO) is obtained in step SA5, so that steps SA2–SA7 are repeatedly implemented until the determination by the closed-loop edge set determining means 42 has been effected for all candidate edge groups Gi determined by the candidate edge determining means 40.

In the illustrated embodiment, the edge pair pointing means 38 is adapted to sequentially point pairs of edges of the three-dimensional wire-frame model, in step SA2, and determine in step SA3 whether the two edges of each pointed pair are connected to each other and lie on the same plane. However, the edge pair pointing means 38 may be adapted to sequentially point pairs of two mutually connected edges in step SA2. In this case, step SA3 is not necessary, since the two mutually connected edges of each pair necessarily lie on the same plane. In the illustrated embodiment, there are a total of 66 pairs of edges which are sequentially pointed in step SA2, in the example of FIG. 3. In the modified embodiment indicated above, there are a total of as small as 24 pairs of mutually connected edges.

Further, step SA9 may be eliminated from the routine of FIG. 4, if the routine is applied to a three-dimensional wire-frame model wherein the candidate edge groups Gi do not have any group whose candidate edges define two or more closed loops.

In the illustrated embodiment, step SA3 is formulated to determine whether the two edges of the pointed pair are connected to each other, as well as whether the two edges lie on the same plane. However, the former determination may be eliminated.

It is to be understood that the present invention may be embodied with various other changes, modifications and improvements, which may occur to those skilled in the art, in the light of the foregoing teaching.

What is claimed is:

1. A method of defining surfaces of a three-dimensional object on the basis of a three-dimensional wire-frame model, using a computer, said method comprising:

an edge pair pointing step of sequentially pointing a plurality of pairs of edges selected from edges which constitute said three-dimensional wire-frame model, each of said pairs of edges consisting of two edges lying on a same plane;

a candidate edge determining step of determining a group of candidate edges consisting of the edges of a currently pointed one of said plurality of pairs and at least one edge which lies on the same plane as the edges of said currently pointed one of said plurality of pairs;

a closed-loop edge set determining step of determining, as a set of closed-loop defining edges, those ones of said candidate edges of said group which cooperate to define a closed loop; and a surface defining step of defining a surface of said three-dimensional object, on the basis of said set of closed-loop defining edges.

2. A method according to claim 1, wherein said edge pair pointing step comprises sequentially pointing said plurality of pairs of edges, each pair consisting of two mutually connected edges lying on the same plane.

3. A method according to claim 1, wherein said three-dimensional wire-frame model includes coordinate values, in a three-dimensional coordinate system, of each of two vertices defining each of said edges of said three-dimensional wire-frame model, and said surface defining step comprises preparing a list of surfaces wherein each of said surfaces is represented by said set of closed-loop defining edges each defined by the two vertices whose coordinate values are known.

4. A computer-aided apparatus for defining surfaces of a three-dimensional object on the basis of a three-dimensional wire-frame model, said apparatus comprising:

edge pair pointing means for sequentially pointing a plurality of pairs of edges selected from edges which constitute said three-dimensional wire-frame model, each of said pairs of edges consisting of two edges lying on a same plane;

candidate edge determining means for determining a group of candidate edges consisting of the edges of a currently pointed one of said plurality of pairs and at least one edge which lies on the same plane as the edges of said currently pointed one of said plurality of pairs;

closed-loop edge set determining means for determining, as a set of closed-loop defining edges, those ones of said candidate edges of said group which cooperate to define a closed loop; and surface defining means for defining a surface of said three-dimensional object, on the basis of said set of closed-loop defining edges.

5. An apparatus according to claim 4, wherein said edge pair pointing means comprises means for sequentially pointing said plurality of pairs of edges, each pair consisting of two mutually connected edges lying on the same plane.

6. An apparatus according to claim 4, wherein said three-dimensional wire-frame model includes coordinate values, in a three-dimensional coordinate system, of each of two vertices defining each of said edges of said three-dimensional wire-frame model, and said surface defining step comprises preparing a list of surfaces wherein each of said surfaces is represented by said set of closed-loop defining edges each defined by the two vertices whose coordinate values are known.

* * * * *